(12) United States Patent
Ruider et al.

(10) Patent No.: US 10,935,130 B2
(45) Date of Patent: Mar. 2, 2021

(54) SHIFTABLE SHAFT CONNECTION DEVICE, METHOD FOR SHIFTING A SHAFT CONNECTION DEVICE AND VEHICLE TRANSMISSION

(71) Applicant: ZF Friedrichshafen AG, Friedrichshafen (DE)

(72) Inventors: Martin Ruider, Schwarzhofen (DE); Michael Ibele, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/390,514

(22) Filed: Apr. 22, 2019

(65) Prior Publication Data
US 2019/0323601 A1 Oct. 24, 2019

(30) Foreign Application Priority Data
Apr. 24, 2018 (DE) ...................... 10 2018 206 297.8

(51) Int. Cl.
*F16H 61/32* (2006.01)
*F16H 63/30* (2006.01)

(52) U.S. Cl.
CPC ......... *F16H 61/32* (2013.01); *F16H 63/3069* (2013.01); *F16H 2063/3073* (2013.01)

(58) Field of Classification Search
CPC ................ F16H 61/32; F16H 63/3069; F16H 2063/3073; F16H 63/304; F16H 63/04; F16H 21/16; F16H 25/186; F16H 2063/3093; F16D 23/12; F16D 2023/123; F16D 11/14; F16D 2125/36
(Continued)

(56) References Cited

U.S. PATENT DOCUMENTS

| 8,720,289 B2 * | 5/2014 | Howard ................ F16H 25/122 74/56 |
| 9,772,011 B2 * | 9/2017 | Boeck ..................... F16D 11/14 |

(Continued)

*Primary Examiner* — Victor L MacArthur
(74) *Attorney, Agent, or Firm* — Brinks Gilson & Lione

(57) ABSTRACT

A shiftable shaft connector that has a sliding sleeve that can be displaced axially between an engaged position and a disengaged position, a shifting gear (6) with a shifting contour (11) that is connected in an axially fixed manner to the sliding sleeve and can rotate in relation thereto, at least one support element corresponding to the shifting contour (11), and an actuator for rotating the shifting gear (6), in which the shifting contour (11) has a release stop (14) assigned to the disengaged position, and an engagement selection stop (15) and an engagement stop (16) assigned to the engaged position, a method for shifting such a shaft connector, wherein the shifting gear (6) is rotated in a releasing direction in order to displace the sliding sleeve into the disengaged position, until the at least one support element reaches the release stop (14) of the shifting contour (11), and is rotated in an engagement direction in order to displace the sliding sleeve into the engaged position of the shifting gear (6), until the at least one support element reaches the engagement selection stop (15) of the shifting contour (11), and a vehicle transmission that has a drive shaft and an output shaft, wherein the vehicle transmission has a shaft connector of the type described above, that acts between the drive shaft and the output shaft.

15 Claims, 3 Drawing Sheets

(58) Field of Classification Search
USPC ....... 74/321–325, 333, 337.5, 358; 192/54.2, 192/54.5
See application file for complete search history.

(56) References Cited

U.S. PATENT DOCUMENTS

| | | | |
|---|---|---|---|
| 2006/0011001 A1* | 1/2006 | Showalter | F16D 28/00 74/23 |
| 2010/0275716 A1* | 11/2010 | Mourad | F16H 63/18 74/473.36 |
| 2012/0037472 A1* | 2/2012 | Rosemeier | F16H 61/32 192/66.1 |
| 2014/0116180 A1* | 5/2014 | Keller | F16D 11/10 74/473.36 |
| 2015/0025763 A1* | 1/2015 | Hosokawa | F16D 13/38 701/68 |
| 2018/0372168 A1* | 12/2018 | Beigang | F16D 28/00 |

* cited by examiner

SHIFTABLE SHAFT CONNECTION DEVICE, METHOD FOR SHIFTING A SHAFT CONNECTION DEVICE AND VEHICLE TRANSMISSION

CROSS-REFERENCE TO RELATED APPLICATIONS

This application claims priority from German Patent Application DE 10 2018 206 297.8, filed Apr. 24, 2018, the entirety of which is hereby fully incorporated by reference herein.

The invention relates to a shiftable shaft connector that has a sliding sleeve that can be slid axially between an engaged position and a disengaged position, a shifting gear with a shifting contour that is axially connected to the sliding sleeve such that it can rotate in relation thereto, at least one support element corresponding to the shifting contour, and an actuator for rotating the shifting gear. The invention also relates to a method for shifting such a shaft connector. The invention also relates to a vehicle transmission that has a drive shaft and an output shaft.

A drive converter is known from DE 10 2013 215 849 A1, for converting a rotational drive of a drive device to a translational actuation movement for a shifting element of a transmission with a rotational cam that can be displaced axially, in which the cam has track regions with defined inclines where the cam interacts with at least one element permanently secured to the housing, wherein the cam can be displaced in a translational manner in relation to said element via a rotation of the cam as a function of the incline of the track region. For a more detailed explanation of the features of the present invention, express reference is made to DE 10 2013 215 849 A1. The teachings of this document are to be regarded as a component of the present document. Features of this document can be regarded as features of the present document.

The fundamental object of the invention is to improve the structure and/or function of the shaft connector specified in the introductory paragraphs. The invention also has the fundamental object of improving the method specified above. Another fundamental object of the invention is to improve the structure and/or function of the vehicle transmission specified above.

The shaft connector can be structurally and/or functionally disposed between a first shaft and a second shaft. The first shaft and the second shaft can be coaxial to one another. The shaft connector can have a rotational axis. The shaft connector can be placed such that its rotational axis is coaxial to the first shaft and the second shaft. If not otherwise specified, or it cannot be otherwise derived from the context, the terms "axial," "radial," and "circumferential" refer to the directions of extension of the rotational axis. "Axial" corresponds to the direction of extension of the rotational axis. "Radial" refers to a direction that is perpendicular to the direction of extension of the rotational axis, and intersecting it. "Circumferential" refers to the direction of a curve encircling the rotational axis. The shaft connector can be used to connect the first shaft and the second shaft for conjoint rotation, in order to enable a mechanical power transfer between the shafts. The shaft connector can also be used to separate the first shaft and second shaft, in order to interrupt a mechanical power transfer between the shafts. The shaft connector can be shifted through an axial displacement of the sliding sleeve.

The sliding sleeve can be connected to the first shaft or second shaft for conjoint rotation therewith, and it can be axially displaced in relation to this shaft, and it can be connected to the other shaft for conjoint rotation therewith, or it can be separated therefrom. The sliding sleeve can have a sliding gearing for an axially displaceable connection to the first shaft or second shaft, for conjoint rotation therewith. The sliding sleeve can have a shifting gearing for a connection to the other shaft for conjoint rotation therewith. The shifting gearing can be a dog gearing. In the engaged position, the sliding sleeve can connect the first shaft and the second shaft to one another for conjoint rotation. In the disengaged position, a connection between the first shaft and the second shaft can be released by the sliding sleeve.

The shifting gear can be located on the radial exterior of the sliding sleeve. The shifting gear can rotate about the rotational axis. A pivot bearing can act between the shifting gear and the sliding sleeve. The pivot bearing can be used to accommodate radial forces and axial forces. The pivot bearing can be a roller bearing, e.g. a grooved ball bearing. The shifting gear can be toothed. The gear teeth can be circumferential. The gear teeth can form a helical gearing. The gear teeth can form a worm gearing. The actuator can have a gearwheel that meshes with the gear teeth of the shifting gear, or a worm gear that engages with the gear teeth of the shifting gear. The actuator can have an electric motor. The electric motor can be controlled electronically. The electric motor can be controlled electronically using an electronic control device. A motor current can be detected when the electric motor is in operation. A motor current can be detected using the electronic control device.

The at least one support element can be fixed in place axially and circumferentially. The at least one support element can be permanently secured to the housing. A housing can be a housing in which the shafts that can be connected by the shaft connector are supported. The at least one support element can be in the form of a bolt. The at least one support element can have a longitudinal axis. The longitudinal axis of the at least one support element can be oriented radially. The longitudinal axis of the at least one support element can be oriented axially.

The shifting contour of the shifting gear can be located axially adjacent to the gear teeth. The shifting gear can be guided along the at least one support element at its shifting contour. The shifting contour can be used to displace the sliding sleeve axially. When the shifting gear is rotated. The shifting contour can be in the form of a groove. The shifting contour can be in the form of a track. The shifting contour can form a closed shifting track. The shifting contour can run along the circumference and/or in the axial direction.

The release stop can act in the circumferential direction and in the axial direction. The engagement selection stop can act in the circumferential direction. The engagement stop can act in the radial direction.

The shifting contour can have an engagement path. The engagement path can run between the release stop and the engagement stop. The engagement path can have a selection section. The selection section can run between the release stop and the engagement selection stop. The selection section can run circumferentially. The engagement path can have a shifting section. The shifting section runs between the engagement selection stop and the engagement shifting stop. The shifting section can run axially. The shifting contour can have a release path. The release path can run between the engagement shifting stop and the release stop. The shifting gear can be subjected to an axial spring force pushing it toward the release stop. The shifting gear can be subjected to the axial spring force such that the shifting contour is held tightly against the support element.

The shifting contour can have at least one retaining section. The at least one retaining section can act circumferentially. The at least one retaining section can be located on the release stop. The at least one retaining section can be located upstream of the engagement selection stop. The at least one retaining section can be located on the engagement shifting stop. The at least one retaining section can interact with the at least one support element. The at least one retaining section can form a retaining resistance when the shifting gear is rotated.

The at least one support element can have a base section. The base section can be in the shape of a sleeve. The at least one support element can have a guide section. The guide section can be in the shape of a bolt. The guide section can be displaced in relation to the base section. The guide section can be formed in the shifting contour. The guide section can be subjected to a spring force such that the guide section is tightened against the shifting contour. A spring can act between the base section and the guide section. The spring can be a helical compression spring.

The shifting contour can be contoured axially and circumferentially. The shifting contour can have a floor. The shifting contour can have a retaining deflector. The retaining deflector can be used to deflect the at least one support element into the selection section after passing through the release path. The floor can have a ramped section that forms the retaining deflector. The ramped section can be located on the release path. The ramped section can rise toward the disengaged position. The ramped section can decline in steps toward the disengaged position. The guide section can interact with the retaining deflector due to it being displaceable in relation to the base section, such that the at least one support element is deflected into the selection section of the engagement path after passing through the release path.

The guide section can have a bearing ring in order to reduce friction as it is guided along the shifting contour. The bearing ring can be rotatably supported by a bearing. The bearing can be a sliding bearing or a roller bearing. The roller bearing can be a needle bearing. As an alternative to the use of the retaining deflector, the guide section can be fixed in relation to the base section, such that only the bearing ring can be displaced radially, e.g. with the aid of the bearing.

The shifting gear can be rotated in an engagement direction over a rotational angle. The shifting gear can be rotated in a disengagement direction over a rotational angle. The engagement direction and the disengagement direction can be opposing. A rotating over a rotational angle can be defined by a stop, which only allows rotation in the engagement direction or in the releasing direction.

When the shifting gear is rotated in the releasing direction from a position in which the sliding sleeve is in the engaged position, the at least one support element can pass through the release path until reaching the release stop. The at least one support element can pass over the retaining deflector in doing so. When the shifting gear is rotated in the engagement direction from a position in which the sliding sleeve is located in the disengaged position, the at least one support element can pass through the selection section of the engagement path until reaching the engagement selection stop. Prior to reaching the engagement selection stop, an axial displacement of the sliding sleeve can be blocked by guiding the at least one support element into the selection section of the engagement path. Upon reaching the engagement selection stop, the at least one support element can pass through the shifting section of the engagement path, and the sliding sleeve can then be displaced axially.

A motor current can be detected in order to detect when the at least one stop section reaches the release stop. A motor current can be detected in order to detect when the at least one stop section reaches the engagement selection stop. A motor current can be detected in order to detect when the at least one stop section is retained in a retaining section of the shifting contour. A motor current can be detected in order to detect when a stop section has exited a retaining section of the shifting contour.

The vehicle transmission can be an axle gearing. The vehicle transmission can be a distributer gearing. The vehicle transmission can be a differential gearing. The vehicle transmission can be located in a vehicle drive train. The vehicle transmission can be located on a vehicle axle that can be connected to a drive machine and disconnected from a drive machine. The drive shaft can have a dedicated drive machine. The output shaft can have a dedicated drivable gear. The drive shaft and the output shaft can be connected to and disconnected from one another by the shaft connector. The drive shaft and the output shaft can be connected to one another, for example, when the vehicle axle on which the vehicle transmission is located is connected to a drive machine. The drive shaft and the output shaft can be separated from one another, for example, when the vehicle axle on which the vehicle transmission is located is separated from a drive machine, in order to minimize power loss.

The term "can" indicates an optional feature of the invention, in particular. Accordingly, there is always one exemplary embodiment of the invention that has the respective feature or respective features.

In summary, and in other words, among other things, a mechanical retention function for detecting the end positions of a dog clutch is thus obtained with the invention by means of a helical gear. The end positions can be assigned to the engaged position and the disengaged position. The sliding sleeve can be a part of the dog clutch. The helical gear can also be referred to as a shifting gear. The system can be configured such that when the end position assigned to the engaged position is securely reached, the correct position for "engaging" the dog can be approached, and a position sensor for this can be eliminated. This can be obtained using mechanical stops. Tappets on the housing can be used for this, which can move axially, and are permanently held in an extended position via an energy storage element, e.g. a spring. A connecting element of the shifting gear can be configured such that it pushes the tappets axially outward during a disconnect process. The disconnect process can also be referred to as a disengagement process. If the "disengaged" position has been reached, the tappets can be pushed back in by the energy storage element. The disengaged position can also be referred to as the release position. A motor can then rotate the shifting gear against a fixed mechanical end stop. When this position has been reached, it can then be detected in the motor current; if the rotational rate equals 0, there is a higher current. For shifting, a rotational direction of the motor can be reversed, and the shifting gear can be rotated back. As the result of a structural step, the connecting element can follow a different path when the shifting gear is rotated back. A meshing of the dog clutch can be released with this construction via a "connected" position, when the motor reaches an opposing mechanical stop. The "connected" position can also be referred to as the engaged position. As a result, it is possible to prevent a collision with the connecting element track. A position sensor is therefore no longer needed, the positions can be safely reached and retained, and the risk of the elements not being in the right place when engaging the clutch is also eliminated.

There is no need for a position sensor with the invention. A position of the sliding sleeve in the released position can be clearly determined. The connection between a rotational angle of the shifting gear and an axial position of the sliding sleeve is maintained. Wear is reduced.

Exemplary embodiments of the invention shall be explained in greater detail below based on the figures. Further features and advantages can be derived from this description. Concrete features of these exemplary embodiments can represent general features of the invention. Features of these exemplary embodiments connected to other features can also represent individual features of the invention.

Therein:

Figure 1:
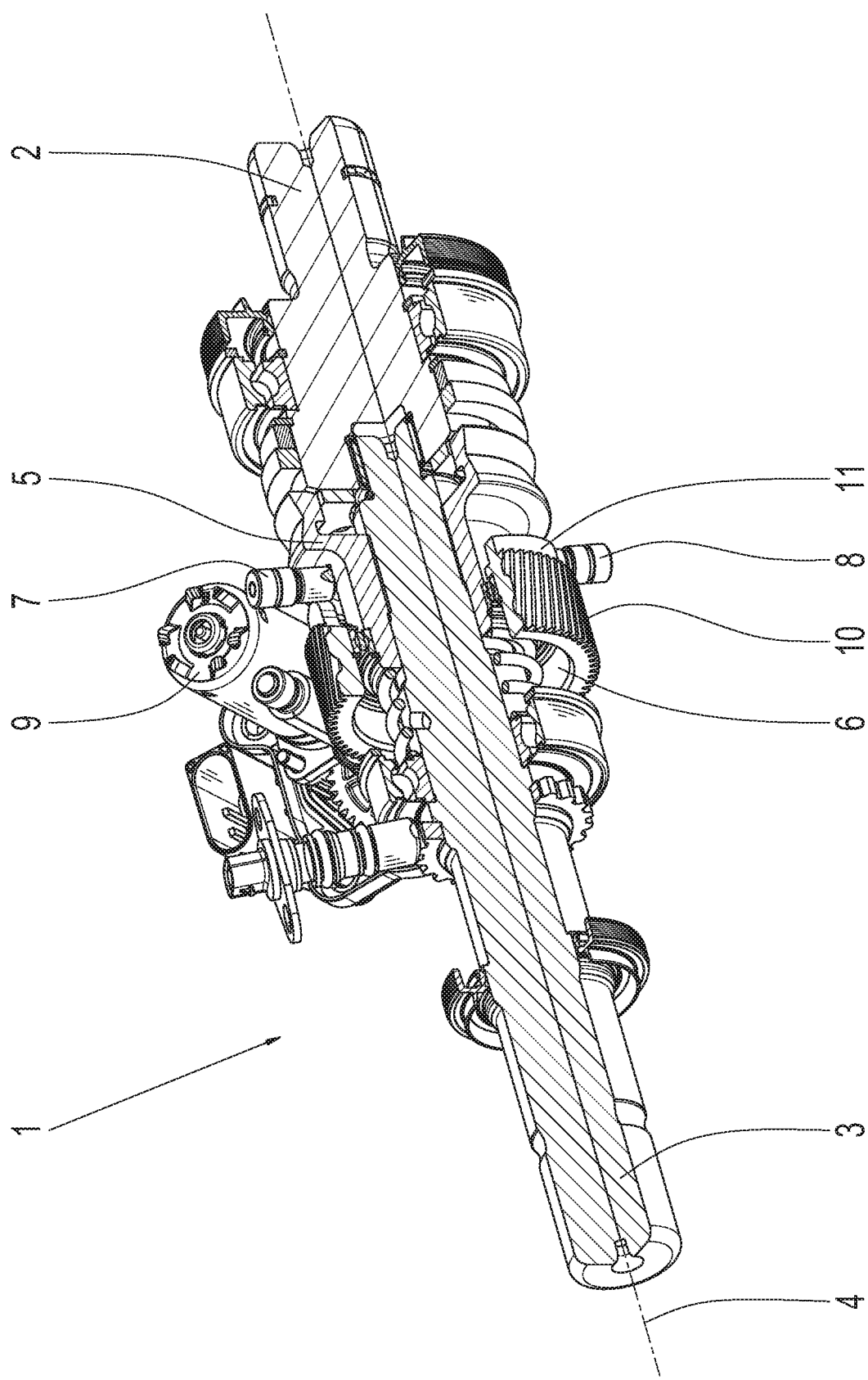
FIG. 1 shows a shiftable shaft connector between a drive shaft and an output shaft that can be effectively shifted, which has a sliding sleeve, a shifting gear with a shifting contour, support elements, and an actuator.

FIG. 1 shows a shiftable shaft connector 1. The shaft connector 1 acts between a drive shaft 2 and an output shaft 3 of an axle gearing of a vehicle, not shown in greater detail. The axle gearing has a housing in which the drive shaft 2 and the output shaft are rotatably supported. The axle gearing can be connected to a drive machine of the vehicle, and can be separated from the drive machine. The drive shaft 2 and the output shaft 3 are connected to one another with the shaft connector when the axle gearing is connected to the drive machine, and separated from one another when the axle gearing is separated from the drive machine, in order to minimize power losses.

The drive shaft 2, the output shaft 3, and the shaft connector 1 have a common rotational axis 4. The present description refers to the rotational axis 4 if not otherwise specified, or it cannot be otherwise derived from the context. "Axial" thus refers to the direction of extension of the rotational axis 4. "Radial" is a direction of extension perpendicular to the rotational axis 4, and a direction intersecting the rotational axis 4. "Circumferential" refers to a direction encircling the rotational axis 4.

The shaft connector 1 has a sliding sleeve 5, a shifting gear 6, support elements 7, 8, and an actuator 9.

The sliding sleeve 5 is connected to the output shaft 3 for conjoint rotation therewith, and can be slid axially between an engaged position and a disengaged position. The sliding sleeve 5 has a dog gearing. The drive shaft 2 has a dog gearing corresponding to the dog gearing of the sliding sleeve 5. By axially displacing the sliding sleeve 5 into the engaged position, the dog gearings of the sliding sleeve 5 and the drive shaft 2 mesh, in order to connect the drive shaft 2 to the output shaft 3 for conjoint rotation therewith. By axially displacing the sliding sleeve 5 into the disengaged position, the dog gearings of the sliding sleeve 5 and the drive shaft 2 become disengaged from one another in order to separate the drive shaft 2 and the output shaft 3 from one another.

The shifting gear 6 is connected radially to the outside of the sliding sleeve 5, such that it is fixed in place axially, and can rotate in relation to the sliding sleeve 5. The shifting gear 6 has a gear teeth 10. The actuator 9 rotates the shifting gear 6, and has a gearwheel that engages with the gear teeth of the shifting gear 6, and an electric motor that can be controlled electronically, the motor current of which can be detected.

The shifting gear 6 has a shifting contour 11. The shifting contour 11 interacts with the support elements 7, 8. The shifting contour 11 is in the form of a groove, and forms a closed shifting track for each of the support elements 7, 8. The support elements 7, 8 are each in the shape of a bolt with a longitudinal axis, such that their longitudinal axes are oriented in a direction permanently extended radially in relation to the housing of the axle gearing. The support elements 7, 8 each have a base section 12 and a guide section 13. The guide sections 13 of the support elements 7, 8 are formed in the shifting contour 11, such that the sliding sleeve 5 is displaced axially when the shifting gear 6 is rotated.

Figure 2:
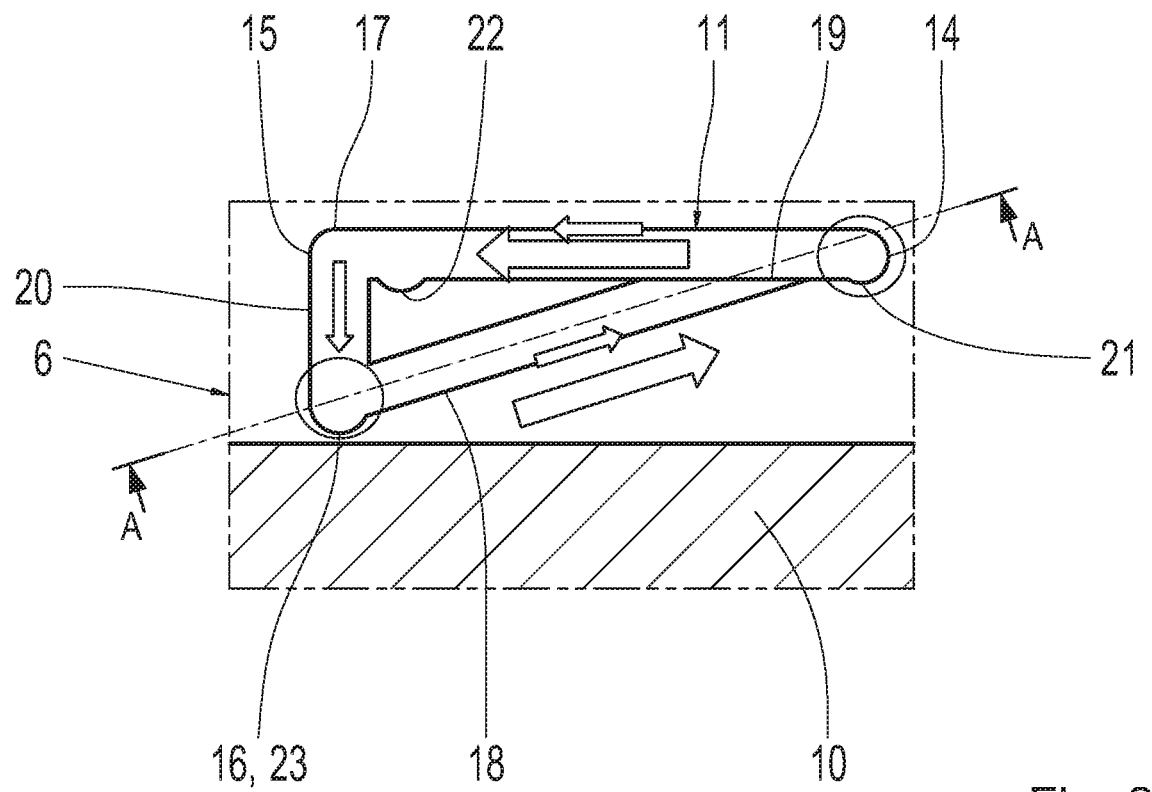
FIG. 2 shows a shifting contour with an engagement path and a release path, viewed from above.

FIG. 2 shows the shifting contour 11 from above. The shifting contour 11 has a release stop 14, an engagement selection stop 15 and an engagement stop 16. The shifting contour 11 has an engagement path 17 between the release stop 14 and the engagement stop 16, and a release path 18 between the engagement stop 16 and the release stop 14. The engagement path 17 has a circumferential selection section 19, and an axial shifting section 20. The release stop 15 acts circumferentially and axially. The engagement selection stop 5 acts circumferentially. The engagement stop 16 acts axially. The shifting gear 6 is subjected to an axial spring force pushing it toward the engagement stop 16.

The shifting contour 1 has a retaining section 21 on the release stop 14, a retaining section 22 upstream of the engagement selection stop 15, and a retaining section 23 on the engagement stop 16. The retaining sections interact with the support elements 7, 8, such that when the shifting gear 6 rotates, a retaining resistance is obtained.

Figure 3:
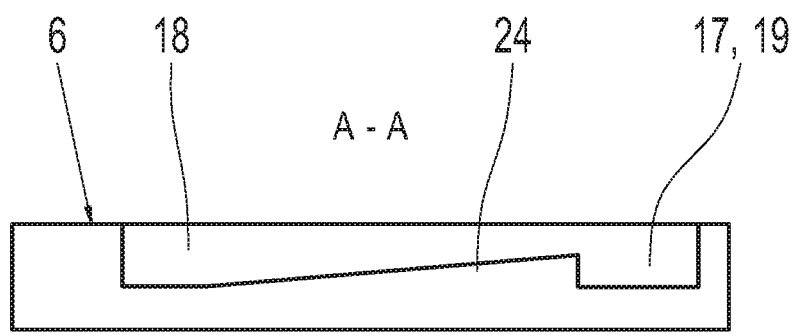
FIG. 3 shows a release path of a shifting contour with a retaining deflector in a sectional view.

The shifting contour 11 has a retaining deflector 24, which deflects the at least one support element into the selection section 19 of the engagement path 17 after passing through the release path 18. A floor of the shifting contour 11 has a ramped section on the release path 18 that forms the retaining deflector 24, which rises toward the release stop 14, and declines toward the release stop 4 in steps. FIG. 3 shows the release path 18 of the shifting contour 11 with the retaining deflector 24 in a sectional view cut along the line A-A indicated in FIG. 2.

Figure 4:
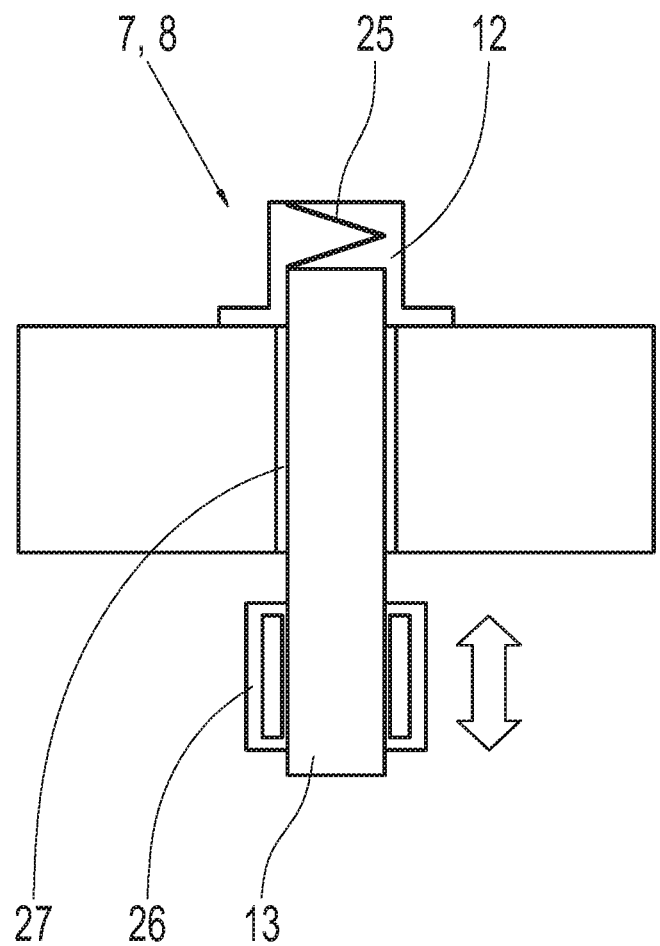
FIG. 4 shows a support element with a base section and a guide section.

FIG. 4 shows a support element 7, 8. The base sections 12 of the support elements 7, 8 are in the shape of a sleeve. The guide sections 13 of the support elements 7, 8 are in the shape of a bolt. The guide section 13 is located in the base section 12 such that it can be displaced in relation to the base section. A spring 25 acts between the base section 12 and the guide section 13, which pushes against the guide section 13 such that the guide section 13 is pressed against the shifting contour.

The guide section 13 interacts with the retaining deflector 24, in that it can be displaced, such that the support elements 7, 8 are deflected into the selection section 19 of the engagement path 17 after passing through the release path 18.

The guide section 13 has a bearing ring 26 in order to reduce friction on the shifting contour, which is rotatably supported by a sliding bearing 27. Optionally, the guide section 13 can be secured such that it cannot move in relation to the base section 12, and only the bearing ring 26 can be displaced radially with the aid of the sliding bearing 27 in order to use the retaining deflector 24.

The shifting gear 11 can be rotated in an engagement direction over a rotational angle, and in a disengagement direction, opposite the engagement direction, over a rotational angle. When the shifting gear 11 is rotated from a position in which the sliding sleeve 5 is in the engaged position in the disengagement direction, the support elements 7, 8 pass through the release path 18 to the release stop 14. The supporting elements 7, 8 pass over the retaining deflector 24 in doing so. When the shifting gear 11 is rotated from a position in which the sliding sleeve 5 is in the disengaged position in the engagement direction, the support elements 7, 8 pass through the selection section 19 of the engagement path 17 to the engagement selection stop 15. Prior to reaching the engagement selection stop 15, axial displacement of the sliding sleeve 5 is blocked by the guidance of the support elements 7, in the selection section 19 of the engagement path 17. After reaching the engagement selection stop 15, the support elements 7, 8 can pass through the selection section of the engagement path 17. An axial displacement of the sliding sleeve 5 is thus enabled, and the dog gearing can mesh when a tooth-to-tooth position is resolved.

When the shaft connector 1 is actuated, a motor current of the actuator 9 is detected, in order to detect that the support elements 7, 8 have reached the release stop 14 and the engagement selection stop 15.

Furthermore, a motor current of the actuator 9 can be detected in order to detect when the support elements 7, 8 are retained in a retaining section 21, 22, 23 of the shifting contour 11 or have exited a retaining section 21, 22, 23 of the shifting contour 11. As a result, it is possible to approach the release stop 14 quickly, while passing slowly through the selection section 19 of the engagement path 17 until reaching the retaining section 22 upstream of the engagement selection stop 15.

REFERENCE SYMBOLS

1 shaft connector
2 drive shaft
3 output shaft
4 rotational axis
5 sliding sleeve
6 shifting gear
7 support element
8 support element
9 actuator
10 gear teeth
11 shifting contour
12 base section
13 guide section
14 release stop
15 engagement selection stop
16 engagement stop
17 engagement path
18 release path
19 selection section
20 shifting section
21 retaining section
22 retaining section
23 retaining section
24 retaining deflector
25 spring
26 bearing ring
27 sliding bearing

The invention claimed is:

1. A shiftable shaft connector comprising:
a sliding sleeve that is axially movable between an engaged position where an input shaft is engaged with an output shaft and a disengaged position wherein the input shaft is disengaged from the output shaft;
a shifting gear with a shifting contour, wherein the shifting gear is connected to the sliding sleeve in an axially fixed manner, and wherein the shifting gear can rotate in relation to the sliding sleeve;
a first support element that is movable within the shifting contour; and
an actuator for rotating the shifting gear,
wherein the shifting contour has a release stop corresponding to the disengaged position,
wherein the shifting contour has an engagement selection stop between the release stop and an engagement stop, and
wherein the shifting contour has the engagement stop corresponding to the engaged position.

2. The shaft connector according to claim 1, wherein the release stop prevents movement of the first support element in the circumferential and axial directions relative to the shifting gear, wherein the engagement selection stop prevents movement of the first support element in the circumferential direction relative to the engagement gear, and wherein the engagement stop prevents movement of the first support element in the axial direction relative to the engagement gear.

3. The shaft connector according to claim 1, wherein the shifting contour has a first path between the release stop and the engagement stop, and wherein the shifting contour has a second path between the engagement stop and the release stop.

4. The shaft connector according to claim 3, wherein the first path has a selection section running circumferentially between the release stop and the engagement selection stop, and wherein the first path has a shifting section running axially between the engagement selection stop and the engagement stop.

5. The shaft connector according to claim 1, wherein the shifting gear is subjected to an axial spring force such that the first support element has pushed toward the engagement stop.

6. The shaft connector according to claim 1, wherein the shifting contour has at least one retaining section for retaining the first support element for retaining the first support element in the engagement stop.

7. The shaft connector according to claim 1, wherein the shifting contour has a retaining deflector for deflecting the first support element into the selection section after the first support element passes through the release path.

8. The shaft connector according to claim 1, wherein the first support element has a base section and a guide section located in the shifting contour.

9. The shaft connector according to claim 8, wherein the guide section can be displaced in relation to the base section.

10. The shaft connector according to claim 8, wherein the guide section is subjected to a spring force.

11. The shaft connector according to claim 1, wherein the shifting gear is rotatable in an engagement direction over a first rotational angle such that the sliding sleeve is moved towards the engaged position, wherein the shifting gear is rotatable in a releasing direction over a second rotational angle such that the sliding sleeve is moved towards the disengaged position, and wherein the engagement direction and the releasing direction are oriented in opposite directions.

12. A method for shifting a shaft connector according to claim 1, wherein the shifting gear is rotated in a releasing direction in order to displace the sliding sleeve into the disengaged position of the shifting gear, until the at least one support element reaches the release stop of the shifting contour, and is rotated in an engagement direction in order to displace the sliding sleeve into the engaged position of the shifting gear until the at least one support element reaches the engagement selection stop of the shifting contour.

13. The method according to claim 12, wherein the actuator has an electric motor, and a motor current is detected in order to detect when the at least one support element reaches the release stop and/or the at least one support element reaches the engagement selection stop.

14. The method according to claim 12, wherein the actuator has an electric motor, and a motor current is detected in order to detect when the at least one support element is retained in a retaining section of the shifting contour and/or exits a retaining section of the shifting contour.

15. A vehicle transmission that has a drive shaft and an output shaft, wherein the vehicle transmission has a shaft connector according to claim 1, acting between the drive shaft and the output shaft.

\* \* \* \* \*